Jan. 7, 1930.   E. WHITAKER   1,743,056
SPRAYING DEVICE
Filed Oct. 17, 1927   2 Sheets-Sheet 1
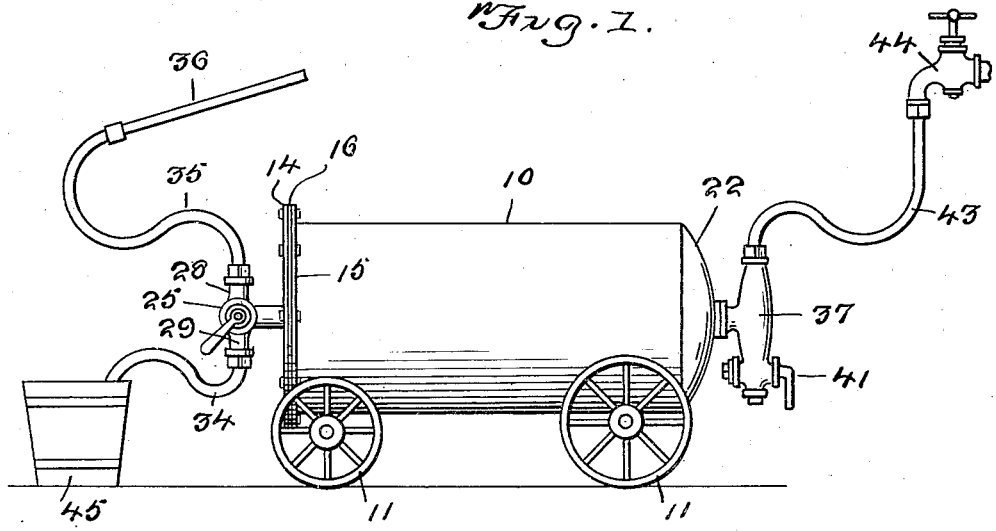
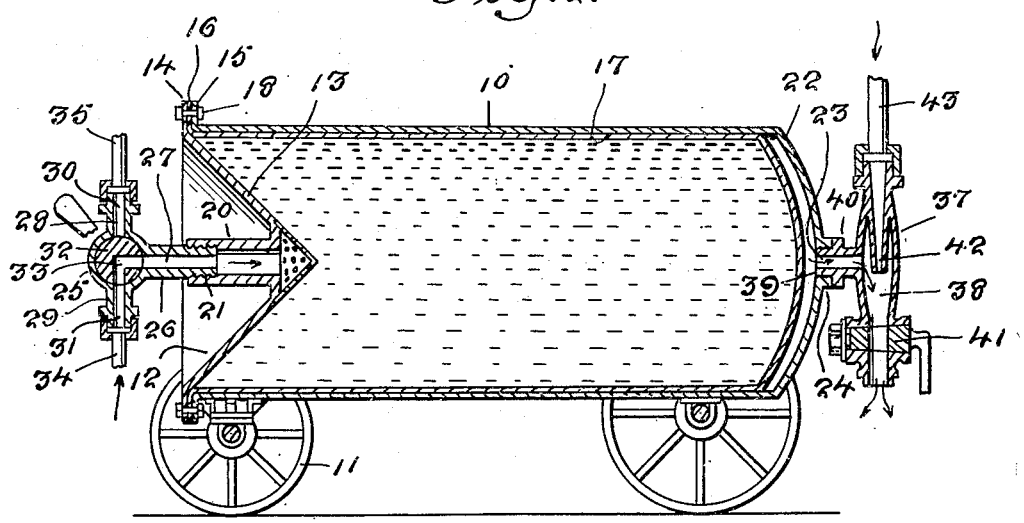
E. Whitaker
INVENTOR
BY Victor J. Evans
ATTORNEY Jan. 7, 1930.  E. WHITAKER  1,743,056
SPRAYING DEVICE
Filed Oct. 17, 1927   2 Sheets-Sheet 2
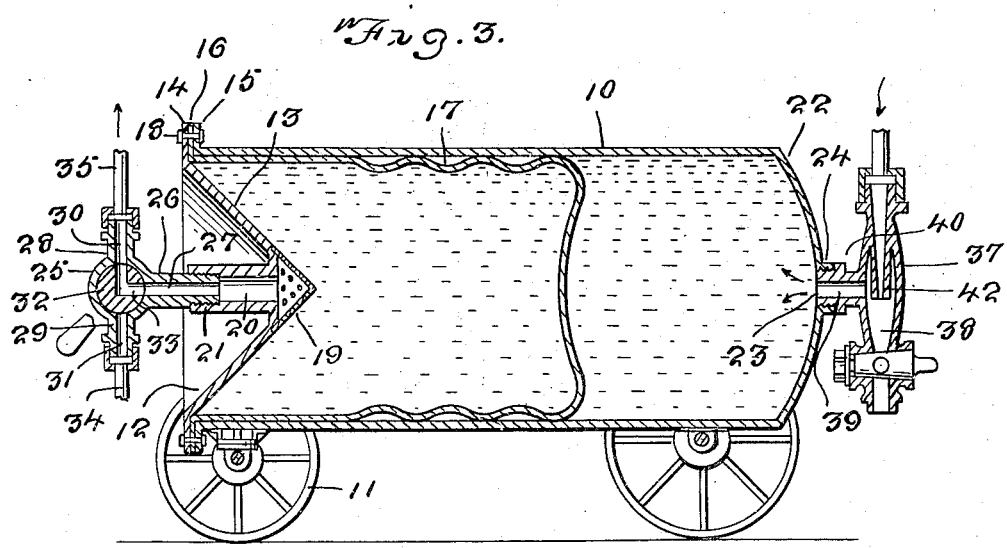
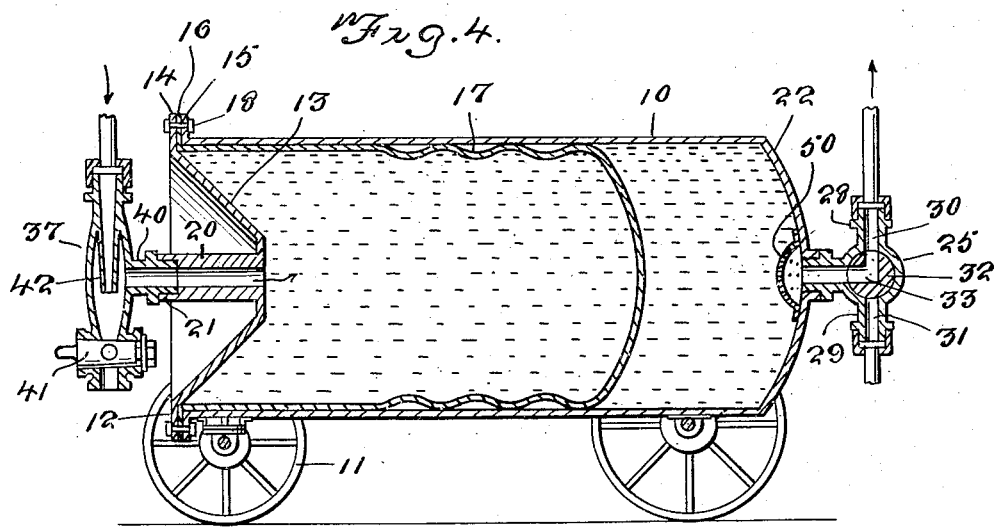
E. Whitaker
INVENTOR
BY Victor J. Evans
ATTORNEY Patented Jan. 7, 1930

1,743,056

UNITED STATES PATENT OFFICE

ELBERT WHITAKER, OF PORTLAND, OREGON

SPRAYING DEVICE

Application filed October 17, 1927. Serial No. 226,807.

The present invention relates to a spraying device and has for its object to provide a device of this character operable by the flow of water from a faucet.

More specifically, objects of the invention are to provide means in connection with a tank for filling the same with a spraying liquid by the use of the flow of water through a chamber connected with said tank, and for the spraying of said liquid out of said tank by means directing water into the tank.

Other objects and advantages will appear from the following specification and will be set forth in the appended claims, and I do not wish to be limited in the scope of my invention except as I shall be limited by said claims.

In the drawings:

Figure 1 is an elevation of a tank in accordance with my invention and having the means for operating the same attached thereto.

Figure 2 is a section taken through the longitudinal center of the tank and showing the internal construction thereof and of the associated mechanism, also showing the same connected for filling the tank with spraying liquid.

Figure 3 is a view similar to Figure 2, showing the tank connected up for ejecting spraying fluid for spraying purposes.

Figure 4 is a view showing the reversal of the associated mechanism on the tank.

Referring to the drawings in detail, 10 designates a tank which may be mounted on wheels 11 for traction purposes, said tank being provided with a closure 12 at one end having a cone-shaped portion 13 and an annular flange 14 at the outer edge of the cone-shape portion for cooperation with similar circular flange 15 formed on the end of the tank, the two flanges receiving therebetween an outwardly flared circular end 16 of a compressible member 17 contained within the tank and adapted to fill the same when distended. The flanges and the portion 16 of the sack referred to are held together by bolts 18 passing through alined apertures therein. The inner end of the cone-shaped closure 13 is preferably provided with a foraminous cap 19 fitting thereover and opposite said cap is a tubular stem 20 extending outwardly and provided internally at its outer end with threads 21. The opposite end 22 of the tank is apertured at 23 and provided with an outstanding flange 24 internally threaded as in the case of the stem 20.

As shown in Figure 2, a three-way valve connection 25 is provided having a tubular arm 26 threadedly connected in the end of the stem 20 and having a passageway 27 therethrough. At right angles to the arm 26 are arms 28 and 29 also provided with passageways 30 and 31. A valve member 32, having an elbowed passage 33 extending therethrough and adapted to be rotated so that the passageway 27 may be connected with either the passageway 30 or 31, is provided.

A hose 34 may be connected to the lower arm 29 and the end may be placed in a suitable vessel containing the liquid to be sprayed. A hose 35 may be secured to the arm 28 having a spraying nozzle 36 secured thereto.

Secured in the aperture 23 at the opposite end of the tank is an aspirating device 37 having a passageway 38 extending therethrough at right angles to a passageway 39 extending through the connection 40 with the aperture 23. The lower end of the aspirating device may be provided with a valve 41 adapted for closing one end of the passageway 38. The other end is provided with a nozzle 42 projecting to a point slightly beyond the passageway 39, and to this end of the member 37 is secured a hose 43 which may be connected with a faucet 44, or any other suitable source of water supply.

In filling the tank with spraying liquid, presuming that the same is empty, the valve 41 is turned to open position and the water at the faucet 44 is turned on, the hose 34 having its open end in a vessel 45 containing the spraying liquid. As the water from the faucet 44 is projected through the open valve 41 it will cause a vacuum in the tank 10, thereby causing a suction through the hose 34 when the valve 32 is turned to position as shown in Figure 2, causing the liquid from the vessel 45 to be drawn into the flexible sack 17 until the liquid distends the sack to fill the tank. When it is desired, on the other hand, to spray the liquid so drawn into the tank, the valve 41 is closed and the valve 32 turned to position to connect channel 30 with the channel 27, whereupon water flowing through the hose 43 into the tank will force the liquid out in a spray through the nozzle 36. When the tank has been emptied of the spraying liquid, it is obvious that it will be filled with water flowing thereto from the faucet, and when it is desired to withdraw this water it may be allowed to flow out by gravity or be forced out by any suitable means through the open valve 41 until it has reached the level of the aperture 23, whereupon the aspirating action may be set up, thoroughly emptying the tank. It will be understood that the seal between the flanges 14 and 15 must be hermetical to make the above operations effective.

The foraminous member 19 is provided in order to prevent solid matter from passing therethrough and it will appear that the location of the spraying and aspirating devices may be reversed, as shown in Figure 4, by a slight alteration of the construction by placing a foraminous screen 50 over the aperture 23.

Having described my invention, what I claim is:—

1. A spraying device comprising a wheeled tank, a closure for said tank, means for securing the closure thereto, an inflatable member arranged in said tank and secured therein by the closure securing means, a three-way valve connection carried by the closure, a hose depending from the three-way valve connection, a nozzle bearing hose carried by the three-way valve connection, an aspirating means in communication with the tank and including a nozzle extending below the line of communication, means for connecting the aspirating means with a source of fluid under pressure, a valve controlling an outlet for said aspirating means, and said inflatable member being in communication with the three-way valve connection for receiving liquid therefrom.

2. A spraying device comprising a tank, wheels for said tank, a substantially cone-shape closure for one end of said tank and secured thereto in an air-tight manner, a tube formed with said closure and in communication with said tank, a tubular arm threadedly secured to said tube and included in a three-way valve connection, aligned arms disposed at right angles to the tubular arm and arranged in communication therewith, a valve member in the three-way valve connection for controlling the communication, aspirating means in communication with the opposite end of said tank and including means having a passageway connected with said tank, a passageway at right angles to the first mentioned passageway, a nozzle in the last mentioned passageway and extending slightly below the first mentioned passageway, means for securing the nozzle in communication with a source of fluid under pressure, a valve included in the aspirating means and disposed below the nozzle, said valve controlling the outlet of the aspirating means, a hose for each aligned arm, a nozzle carried by one of said hose, and an inflatable member arranged in said tank and being in communication with the three-way valve connection.

3. In combination, a closed tank having a port opening through each end thereof, an inflatable bag secured at its open end to one end of said tank and dividing the interior of the tank into two chambers communicating respectively with said ports, a three-way valve having one of its passages in communication with one of said ports and having each of its two other passages provided with hose couplings, and an aspirator having a lateral inlet in communication with the other of said tank ports and comprising an inlet nozzle extending within the body of the aspirator to a point beyond said lateral port.

In testimony whereof I affix my signature.

ELBERT WHITAKER.